Jan. 14, 1930.                C. PAULSON                1,743,386
                      ELECTRICAL TESTING APPARATUS
                          Filed July 12, 1927
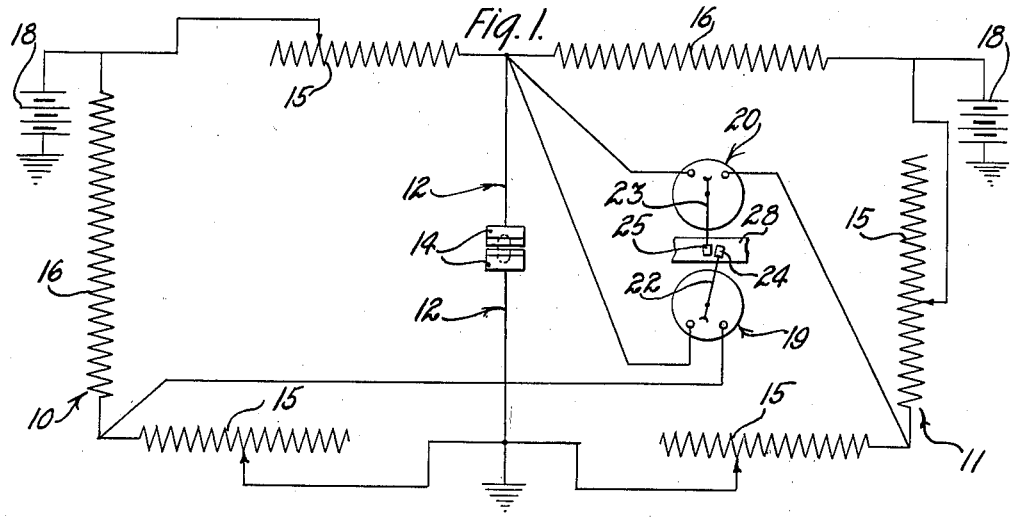
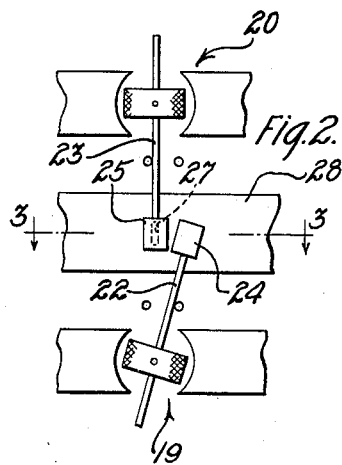
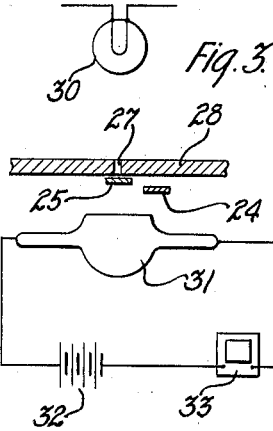
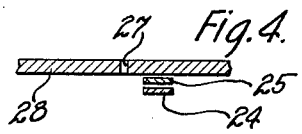
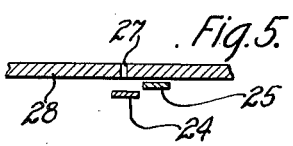
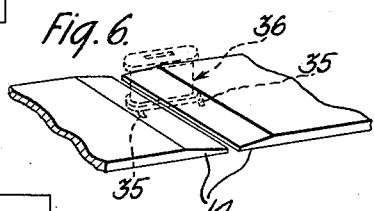
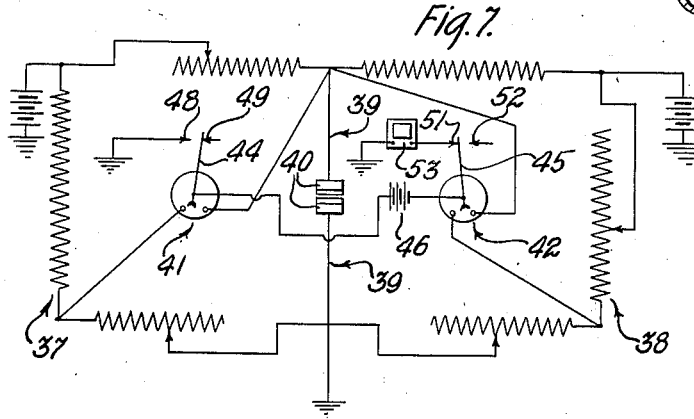
Inventor
Christian Paulson
by [signature] Atty Patented Jan. 14, 1930

1,743,386

UNITED STATES PATENT OFFICE

CHRISTIAN PAULSON, OF CHICAGO, ILLINOIS, ASSIGNOR TO WESTERN ELECTRIC COMPANY, INCORPORATED, OF NEW YORK, N. Y., A CORPORATION OF NEW YORK

ELECTRICAL TESTING APPARATUS

Application filed July 12, 1927. Serial No. 205,073.

This invention relates to electrical testing apparatus, and more particularly to apparatus for testing resistances within predetermined limits.

In the process of testing specimen resistances it is sometimes necessary to exercise great care in adjusting the instruments employed and in associating the specimens with the instruments. Thus, for example, in the process of conducting high and low limit resistance tests on telephone receiver magnet coils, it has been the practice in some instances to connect a coil within a conventional Wheatstone bridge circuit containing a low resistance standard, balance the circuit and then repeat the operation with a high resistance standard in the circuit. Such practice obviously necessitates considerable skill and care in making the various circuit adjustments and in connecting the fragile terminals of the coils under test in the circuit.

The primary object of this invention is to provide a simple and sensitively operable means for expeditiously conducting resistance tests.

In accordance with the general features of the invention, one embodiment thereof by means of which resistance tests may be quickly and accurately conducted consists in a pair of associated Wheatstone bridge circuits, one arm thereof being common to both circuits and adapted to receive terminals of a telephone magnet coil. A sensitive galvanometer is connected across opposite junctions of each circuit, the extremity of each galvanometer indicator needle being provided with a shutter adapted to intercept light rays directed toward a conventional photo-electric cell within a signaling circuit. The galvanometers are so arranged that when a coil is above or below certain required resistance values, one of the shutters will intercept the light rays, but if the resistance of the coil falls within these limits, the photo-electric cell will respond to the light ray and cause the closing of the signaling circuit.

These and other objects will be apparent from the following detailed description taken in connection with the accompanying drawing, wherein Fig. 1 is a circuit diagram disclosing one embodiment of the invention, the photo-electric cell being removed from association therewith to more clearly disclose the galvanometer shutters;

Fig. 2 is an enlarged fragmentary view of the galvanometers shown in Fig. 1, the shutters thereof being shown in a position which is assumed when the resistance of the coil tested is above a certain maximum value;

Fig. 3 is a fragmentary sectional view taken on the line 3—3 of Fig. 2;

Fig. 4 is a sectional view similar to that disclosed in Fig. 3 showing the position occupied by the shutters when the resistance of a tested coil is within the desired limits;

Fig. 5 is a similar sectional view showing the position of the shutters when the resistance of the coil is below the desired minimum limit;

Fig. 6 is a fragmentary detailed perspective view of the contact plates in the common arm of the Wheatstone bridge circuits, a telephone magnet coil associated therewith being shown in dotted lines, and Fig. 7 is a circuit diagram disclosing a modified or alternative form of the invention wherein the galvanometer needles are employed as conductors.

Referring now to the drawings wherein like numerals have been employed to designate similar parts throughout the various figures, one embodiment of the invention shown in Fig. 1 consists in the combination of two Wheatstone bridge circuits denoted generally by the numerals 10 and 11, a bridge arm 12 which is common to both circuits being provided with a pair of companion contact plates 14. The circuits 10 and 11 include conventional, adjustable resistances 15 and fixed resistances 16, one junction of each circuit being connected to ground through batteries 18. Connected across opposite junctions of the circuits 10 and 11 are galvanometers or other suitable instruments 19 and 20, respectively, which are adapted to respond to variations in current flow through said circuits.

These galvanometers 19 and 20 are provided with pointers or needles 22 and 23, respectively, the outer extremities of which carry shutters 24 and 25. These shutters 24 and 25 are adapted to be carried, upon the actuation of their respective galvanometers, into covering relation with respect to a slit or opening 27 provided in a plate 28 which is interposed between a source of light 30 and a photo-electric cell 31. The photo-electric cell 31 is connected in series with a battery 32 and a buzzer or other suitable signal device 33 and it is to be understood that when a light beam coming from the source 30 is received by the cell 31, the circuit including the signal or buzzer 33 will instantaneously close.

The contact plates 14 are designed to be engaged by opposite, fragile terminals 35 of a telephone magnet coil 36 shown in dotted lines in Fig. 6. The galvanometers 19 and 20 are so arranged that when the plates 14 receive a test coil having a resistance above a predetermined desired value, the shutter 25 carried by the pointer 23 will obstruct the passage of light from the source 30 to the cell 31 and the shutter 24 will occupy a position to the right as shown in Figs. 1 to 3 inclusive. When the resistance of the coil 36 is below a certain maximum and above a predetermined minimum, the shutter 25 will be carried to the right as shown in Fig. 4, thereby permitting a light beam to pass through the opening 27 onto the cell 31 with the result that the circuit containing the cell is closed and the signal 33 energized. If the resistance of the coil 36 is below a predetermined minimum, the shutter 24 will move to the left and occupy the position shown in Fig. 5 so as to prevent the beam of light from being directed onto the cell 31. From the foregoing it will be clear that the signal 33 will only be energized when the resistance of the coil which is being tested is of a value which falls within predetermined maximum and minimum limits. Obviously the resistances 15 of the circuits 10 and 11 may be adjusted in accordance with the specimen or coil which is to be tested and by using the photo-electric cell arrangement a highly sensitive device is presented which enables an unskilled operator to quickly and accurately determine whether the specimen is within the desired maximum and minimum resistance limits.

A modified or alternative form of the invention is disclosed in Fig. 7 wherein a combination of Wheatstone bridge circuits 37 and 38 is employed and a common arm 39 thereof includes a pair of contact plates 40. Galvanometers 41 and 42 are connected across opposite junctions of the circuits 37 and 38 and these galvanometers 41 and 42 are provided with current conducting needles or pointers 44 and 45, respectively. The needles 44 and 45 are connected in series with a battery 46 positioned therebetween. The upper extremity of the needle 44 is adapted to oscillate between and make contact with a grounded contact point 48 and an idle contact 49, and the needle 45 similarly oscillates between a pair of contact points 51 and 52, the contact point 51 being connected to ground through a suitable signal 53. The principle upon which the apparatus disclosed in Fig. 7 operates is similar to the principle already explained in connection with the apparatus disclosed in Fig. 1, the only difference being that in the apparatus disclosed in Fig. 7 the galvanometer needles 44 and 45 form an actual part of the signaling circuit and the photo-electric cell is not employed. Thus it is to be understood that when a coil 36 having a resistance above a certain maximum value is placed across the contact plates 40 the galvanometer needles 44 and 45 will occupy the relative positions shown in Fig. 7 and the signal 53 will not be energized. However, when the resistance of the coil 36 is within predetermined maximum and minimum resistance values, the needle 44 will swing to the left (Fig. 7) and engage the contact point 48, thereby completing the circuit through the signal 53. If the resistance of the coil is below a predetermined minimum value the needle 45 will be carried to the right into engagement with the idle contact point 52, thereby maintaining the signal circuit open.

From the foregoing description of this improved testing apparatus, it will be readily apparent that the invention is particularly applicable in connection with making tests successively on a large number of specimens of coils, the resistances of which come within a certain range. In the operation of the apparatus the resistance of the arms of the Wheatstone bridge circuits is first adjusted so as to prepare the apparatus to be used for testing resistances within a predetermined range. Subsequent to this adjustment it is only necessary for an operator to bridge the contact plates with a specimen or coil for an instant and during this instantaneous contact the operator may observe the relative positions of the galvanometer needles to determine whether the resistance of the coil is above or below certain maximum or minimum values. However, if it is only necessary to make a single determination, namely, to determine whether the resistance of each tested coil is within maximum and minimum limits, the operator need only observe the buzzer signal, the buzzer being energized only when the resistance of the coil being tested is within the desired limits.

What is claimed is:

1. In testing apparatus, a Wheatstone bridge circuit, an associated Wheatstone bridge circuit having a bridge arm in common therewith for receiving a part to be tested, a source of current supply in said circuits, and means responsive to the current flow in said circuits for indicating resistance determinations.

2. In testing apparatus, a Wheatstone bridge circuit, an associated Wheatstone bridge circuit having a bridge arm in common therewith for receiving a part to be tested, a source of current supply in said circuits, and means responsive to the current flow in said circuits for indicating high and low resistance determinations.

3. In testing apparatus, a Wheatstone bridge circuit, a second Wheatstone bridge circuit associated therewith, means included in said circuits for receiving a part to be tested, and means responsive to the current flow in said circuits for instantaneously indicating whether the resistance of an associated part is within predetermined limits.

4. In testing apparatus, a Wheatstone bridge circuit, a second Wheatstone bridge circuit associated therewith, means included within said circuits for receiving a part to be tested, a circuit containing an indicator, and means responsive to the current flow in the Wheatstone bridge circuits for controlling the circuit containing the indicator.

5. In testing apparatus, a Wheatstone bridge circuit, a second Wheatstone bridge circuit associated therewith, means included within said circuits for receiving a part to be tested, a source of light, a photo-electric cell included within an indicator circuit, and a shutter associated with each circuit which is movable in response to current flow in the circuit, one shutter being adapted to intercept a ray from the source when the resistance of an associated part is above a predetermined value and another when the resistance of a part is below a predetermined value.

6. In testing apparatus, a Wheatstone bridge circuit, an associated Wheatstone bridge circuit having a bridge arm in common therewith for receiving a part to be tested, a source of current supply connected to said circuits, a source of light, a photo-electric cell included within an indicator circuit, and means responsive to the current flow in the Wheatstone bridge circuits for intercepting a ray from the light source.

7. In testing apparatus, a Wheatstone bridge circuit, an associated Wheatstone bridge circuit having a bridge arm in common therewith, a pair of contact plates in the common arm adapted to be bridged by a specimen to be tested, a source of current supply connected to the circuits, and means responsive to the current flow occasioned during the bridging of the contact plates for indicating resistance determinations.

In witness whereof, I hereunto subscribe my name this 24th day of June, A. D. 1927.

CHRISTIAN PAULSON.